US007574681B2

(12) United States Patent
Hampton

(10) Patent No.: US 7,574,681 B2
(45) Date of Patent: Aug. 11, 2009

(54) METHOD AND SYSTEM FOR EVALUATING COMPUTER PROGRAM TESTS BY MEANS OF MUTATION ANALYSIS

(75) Inventor: Mark Hampton, Revel (FR)

(73) Assignee: Springsoft USA, Inc., San Jose, CA (US)

( * ) Notice: Subject to any disclaimer, the term of this patent is extended or adjusted under 35 U.S.C. 154(b) by 292 days.

(21) Appl. No.: 11/631,191

(22) PCT Filed: Jul. 12, 2005

(86) PCT No.: PCT/FR2005/001790

§ 371 (c)(1),
(2), (4) Date: Dec. 29, 2006

(87) PCT Pub. No.: WO2006/024723

PCT Pub. Date: Mar. 9, 2006

(65) Prior Publication Data

US 2007/0266351 A1    Nov. 15, 2007

(30) Foreign Application Priority Data

Jul. 30, 2004    (FR) .................................. 04 08429

(51) Int. Cl.
G06F 17/50    (2006.01)
(52) U.S. Cl. .................. 716/4; 716/1; 716/17
(58) Field of Classification Search .............. 716/1, 716/4, 17
See application file for complete search history.

(56) References Cited

U.S. PATENT DOCUMENTS 6,298,317 B1    10/2001    Wiemann
6,810,372 B1    10/2004    Unnikrishnan et al.
7,039,545 B2 *    5/2006    Bundy et al. ................ 702/119

FOREIGN PATENT DOCUMENTS

DE    199 59 157 A1    8/2000
JP    A 2001-2385523    8/2001

OTHER PUBLICATIONS

B. Baudry et al., "Genes and Bacteria for Automatic Test Cases Optimization in the .NET Environment," Proceeding of the 13th International Symposium on Software Reliability Engineering (ISSRE '02), Nov. 12, 2002, pp. 195-206.

* cited by examiner

Primary Examiner—Thuan Do
(74) Attorney, Agent, or Firm—Smith-Hill & Bedell, P.C.

(57) ABSTRACT

Methods and systems for evaluating computer program tests by mutation analysis, including the execution of mutated programs with the insertion of mutations and the identification of mutated programs which, with a pre-determined test, provide a result identical to a pre-determined result. A series of relevant tests is selected for each mutation from a plurality of tests. A mutation ranking system can be determined with the application of at least a first simplicity criterion to the selected series of tests. The mutated programs are subsequently executed according to the mutation ranking order. Each mutated program is executed with the tests from the associated series of tests. In addition, the method can comprise the programming and activation of a programmable circuit. A ranking system for the tests from a series of tests can be determined with the application of a second simplicity criterion to the tests from said series of tests.

18 Claims, 5 Drawing Sheets

METHOD AND SYSTEM FOR EVALUATING COMPUTER PROGRAM TESTS BY MEANS OF MUTATION ANALYSIS

BACKGROUND OF THE INVENTION

The invention relates to a method for evaluating computer program tests by mutation analysis comprising execution of mutated programs by insertion of mutations and identification of the mutated programs providing, with a predetermined test, an identical result to a predetermined result,.

STATE OF THE ART

It is well known in the integrated circuit development field that a complex integrated circuit can contain errors. Different techniques are therefore used to check the operation of an integrated circuit or of a computer program modelling the integrated circuit. Typically, a test suite is performed, each test indicating whether an error has been detected or not.

Mutation analysis is a test evaluation technique which requires large computing resources. When mutation analysis is performed, errors or mutations are inserted in an initially non-mutated program. Then a check is made to see whether the tests detected the inserted mutations. When, with a predetermined test, a mutated program provides an identical result to a result provided by said non-mutated program executed with said test, the mutation is identified as being non-detected. On the other hand, when the result provided by the mutated program, with a predetermined test, is different from the result provided by said non-mutated program executed with said test, the mutation is identified as being detected. The corresponding test is stopped and analysis of the next mutation is performed. The tests enabling mutations to be detected are retained for an improved test suite. The advantage of mutation analysis is to evaluate the quality of the test suite and to optimize the test suite if necessary.

If the tests are performed for a large number of mutations, mutation analysis may take a very long time. In this case, the number of mutations is reduced, for example by choosing a certain kind of mutations or by randomly choosing a certain number of mutations. In both cases, the quality of the test evaluation is impaired.

Document DE19959157 describes a technique for improving a test suite comprising a first step to quickly distinguish subtle mutations from non-subtle mutations and a second step enabling the tests to be evaluated for the non-subtle mutations.

OBJECT OF THE INVENTION

It is an object of the invention to remedy these drawbacks and in particular to minimize the time required for a method for evaluating computer program tests by mutation analysis, in particular by activating a programmable circuit comprising logic sets.

According to the invention, this object is achieved by the appended claims and more particularly by the fact that the method comprises selection, from a plurality of tests, of a suite of relevant tests for each mutation, determination of at least one ranking system by applying at least one simplicity criterion to the selected tests, execution of the mutated programs in the order of ranking, each mutated program being executed with the tests of the associated test suite.

According to a particular embodiment of the invention, the method comprises programming of a programmable circuit by said program comprising the mutations and activation of the programmable circuit, the programmable circuit comprising logic sets respectively associated with the mutations, test inputs to which a checking system applies signals representative of test data and test outputs transmitting signals representative of test results to the checking system, at least one activation input to which the checking system selectively applies activation or deactivation signals of the logic sets, the programmable circuit being programmed in such a way that operation thereof corresponds to said non-mutated program when said logic sets are deactivated and to one of the mutated programs when the corresponding logic set is activated, the method comprising testing of the non-mutated circuit and of the mutated circuits, a mutated program being identified when the corresponding mutated circuit provides, with a predetermined test, an identical result to the result provided by the non-mutated circuit executed with said test.

It is another object of the invention to provide a system for performing a method for evaluating computer program tests by mutation analysis, the method comprising execution of mutated programs by insertion of mutations and identification of the mutated programs providing, with a predetermined test, an identical result to a predetermined result, the system comprising means for selection, from a plurality of tests, of a suite of relevant tests for each mutation, determination of at least one ranking system by applying at least one simplicity criterion to the selected tests, execution of the mutated programs in the order of ranking, each mutated program being executed with the tests of the associated test suite.

It is a further object of the invention to provide a computer-readable medium comprising computer command instructions to execute a method for evaluating computer program tests by mutation analysis comprising execution of mutated programs by inserting mutations and identification of the mutated programs providing, with a predetermined test, an identical result to a predetermined result, the medium comprising command instructions to execute selection, from a plurality of tests, of a suite of relevant tests for each mutation, determination of at least one ranking system by applying at least one simplicity criterion to the selected tests, execution of the mutated programs in the order of ranking, each mutated program being executed with the tests of the associated test suite.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
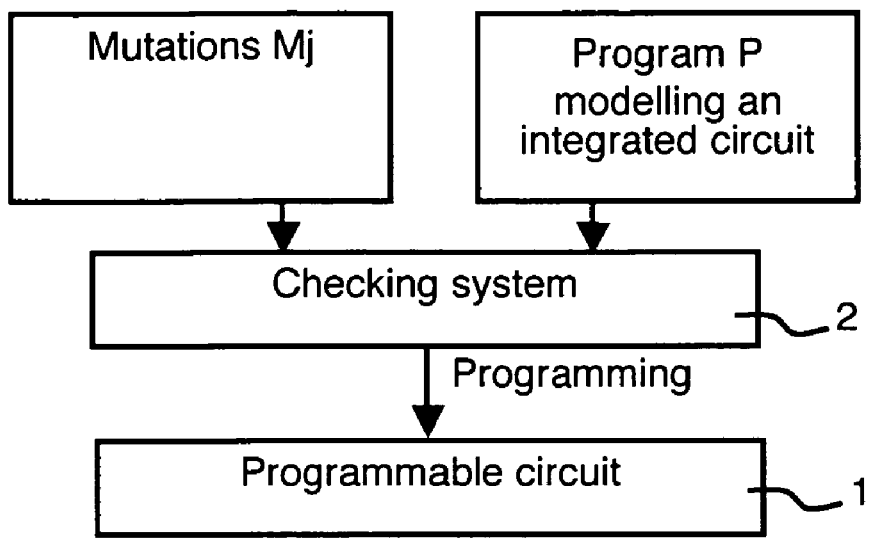
FIGS. 1 to 4 represent different steps of a method for evaluating program tests by mutation analysis by activation of a programmable circuit.

Mutation analysis could be performed by means of a programmable circuit. In this case, mutation analysis can, as represented in FIG. 1, comprise programming of a programmable circuit 1 by a program P containing mutations Mj (M1, M2, M3, etc.). The mutations are hereafter referenced by the index j. The program P models for example an integrated circuit. In FIG. 1, the programmable circuit 1 is programmed by means of a checking system 2. The mutation analysis which is then performed comprises activation of the programmable circuit 1.

Figure 2:
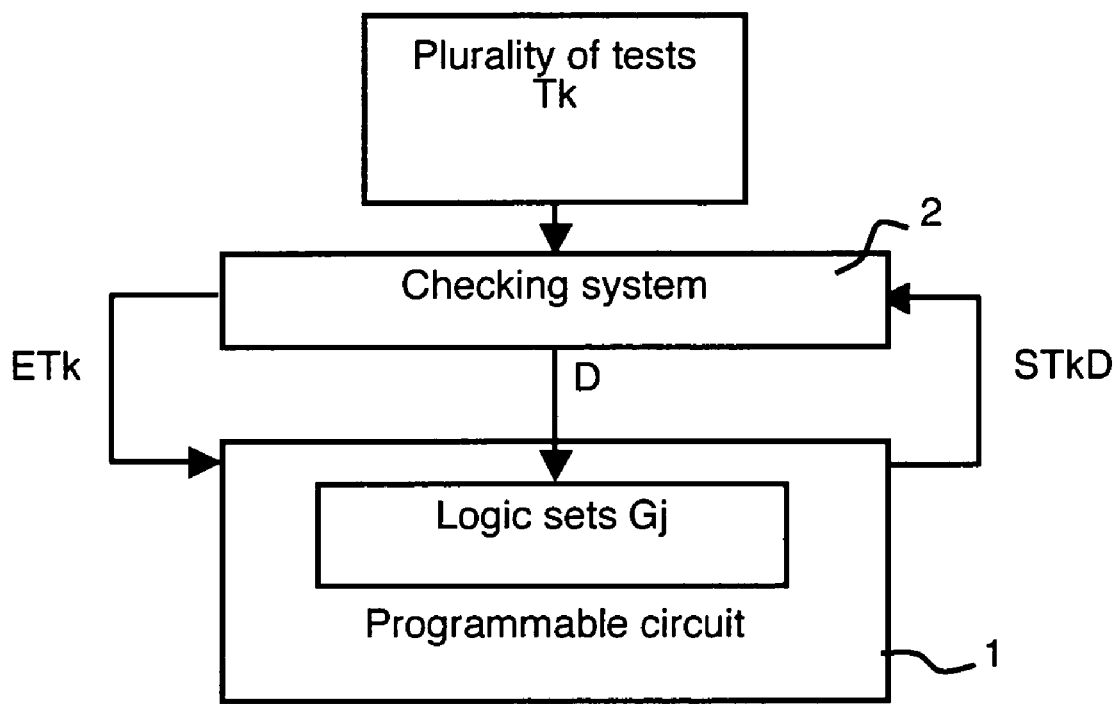

As represented in FIG. 2, the programmable 1 circuit comprises logic sets Gj (G1, G2, G3, etc . . . ) respectively associated with the mutations Mj. The programmable circuit 1 comprises at least one activation input to which the checking system 2 selectively applies activation signals Aj or deactivation signals D of the logic sets Gj. The checking system 2 applies signals Etk (Et1, Et2, Et3, etc . . . ) representative of test data Tk (T1, T2, T3, etc . . . ) to test inputs. Hereinafter, the tests are referenced by the index k. Signals STkD (FIG. 2) and STkj (FIG. 3) representative of results of tests Tk are transmitted by test outputs to the checking system 2.

As represented in FIG. 2, the programmable circuit 1 is programmed in such a way that operation thereof corresponds to the non-mutated program P when the logic sets Gj are deactivated by a deactivation signal D. The outputs of the programmable circuit 1 thus transmit signals STkD representative of the results of the tests Tk applied to the non-mutated circuit.

Figure 3:
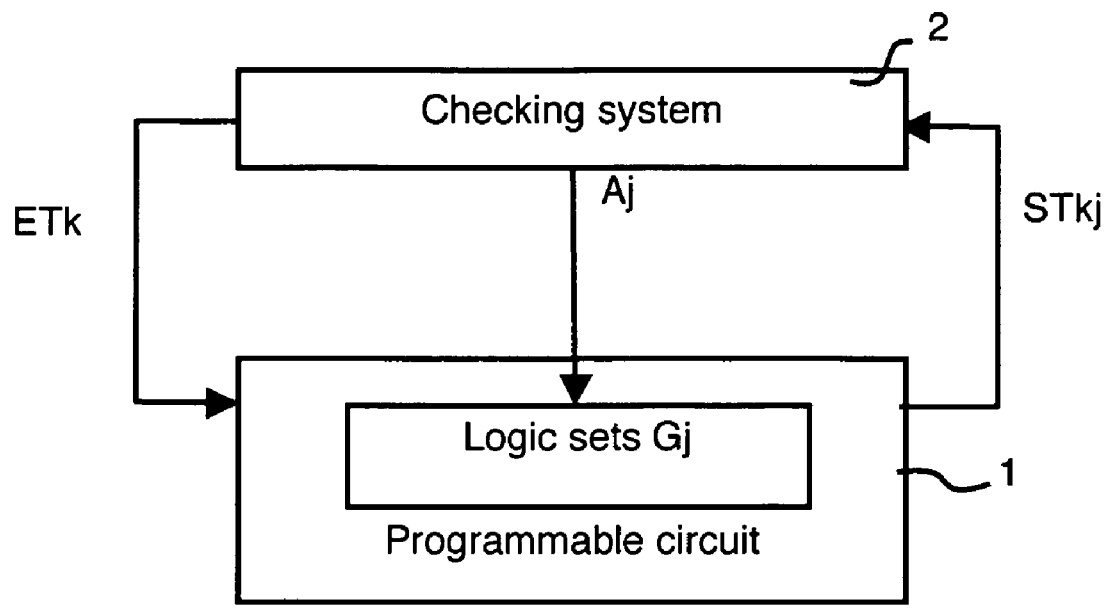

As represented in FIG. 3, operation of the programmable circuit 1 corresponds to the program Pj mutated by the mutation Mj when the corresponding logic set Gj is activated by an activation signal Aj. The outputs of the programmable circuit 1 thus transmit signals STkj representative of the results of the tests Tk applied to the mutated circuit corresponding to the mutated program Pj.

Figure 4:
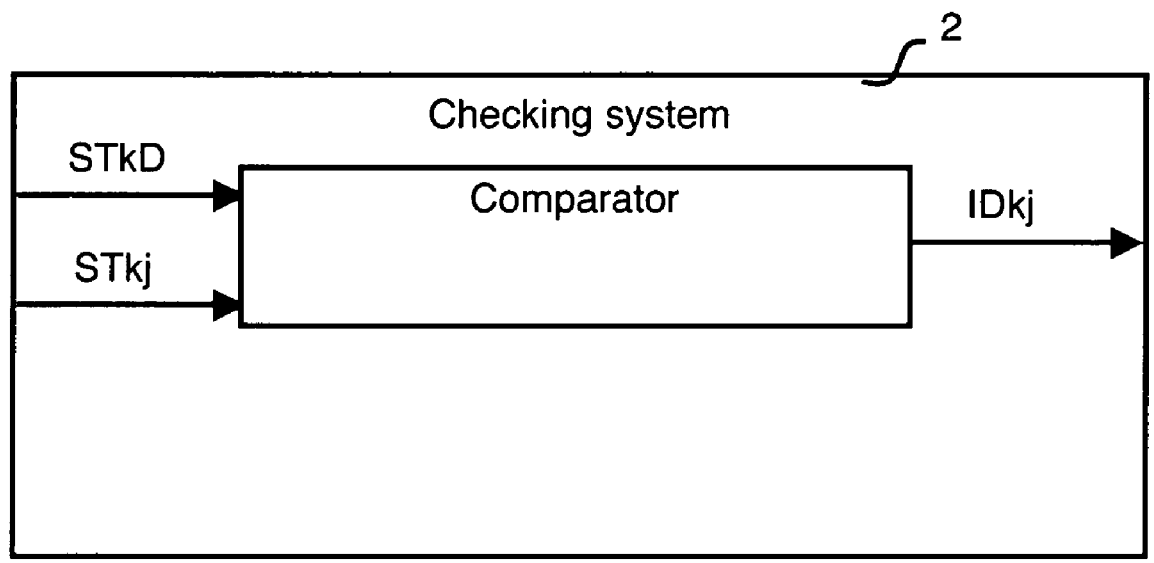

As represented in FIG. 4, the checking system 2 comprises a comparator to compare the signals STkD and STkj. When the signals STkD and STkj are identical, the comparator provides a signal IDkj enabling the test Tk and the corresponding program Pj to be identified. A mutated program Pj is then identified when the corresponding mutated circuit provides, with a predetermined test Tk, a result STkj identical to the result STkD provided by the non-mutated circuit, executed with said test Tk.

Figure 5:
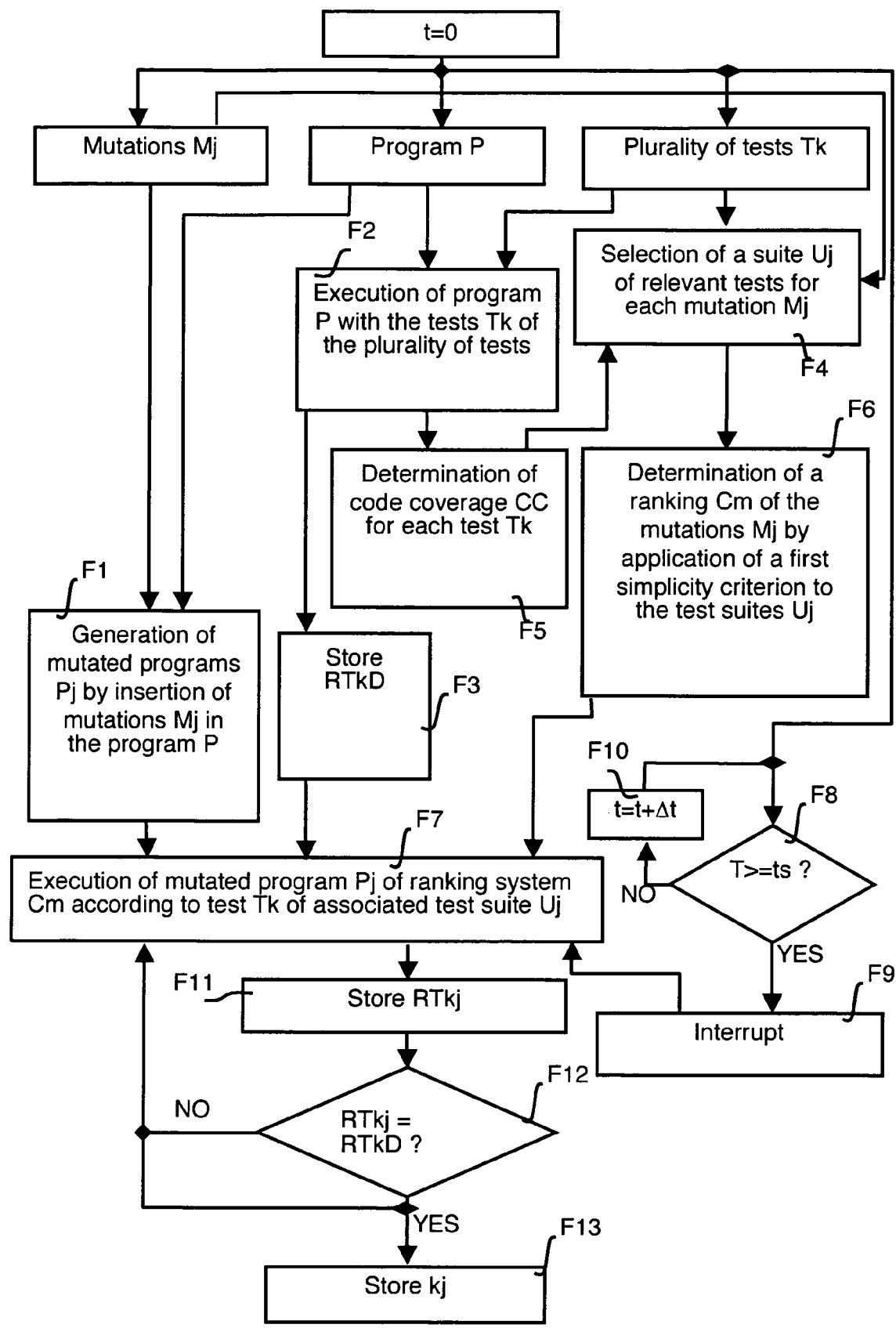
FIG. 5 illustrates a particular embodiment of a method for evaluating according to the invention.

The method represented in FIG. 5 is triggered at time t=0. The mutated programs Pj are generated in a step F1 from the mutations Mj and from the non-mutated program P by inserting the mutations Mj in the program P. All the mutations Mj are preferably inserted in the same program and can be selectively activated or deactivated, in known manner, by activation parameters respectively corresponding to the mutations Mj.

In the particular embodiment represented in FIG. 5, the results RTkD and RTkj are stored and compared at a later stage. In another particular embodiment, the results RTkD and RTkj can be determined simultaneously and compared directly, without requiring storing. Moreover, as soon as a mutation is detected, with a predetermined test, execution of the mutated program Pj with said test is stopped and the next mutation is analyzed.

In a step F2, the non-mutated program P is executed with the tests Tk of the plurality of tests Tk and provides the results RTkD which are stored in step F3. In a selection step F4, a suite Uj of relevant tests is selected from a plurality of tests Tk for each mutation Mj.

Selection F4 of the relevant tests for a predetermined mutation Mj can for example be performed from the code coverage CC of a part Lj of the non-mutated program P designed to be modified by the predetermined mutation Mj. Thus, the method can, in a step F5, comprise determination of the code coverage CC of the non-mutated program P for each test Tk of the plurality of tests.

The code coverage CC, which is for example determined by simulation, indicates the number of times a part Lj, typically a line, of a program P is executed with a given test Tk. For example, table 1 illustrates the code coverage CC of three lines 45 to 47 of a program P, for example a VHDL program, comprising an IF/THEN loop, in which an instruction (line 46) is subjected to a condition (line 45). When the condition is fulfilled, the instruction is executed. When the condition is not fulfilled, the instruction is not executed.

TABLE 1

| Line Number | Code Coverage CC | Code |
| --- | --- | --- |
| 45 | 5 | if (a=b) then |
| 46 | 3 | a<=a+1 ; |
| 47 | 5 | end if ; |

The code coverage CC indicates that the instruction of line 46 is executed three times, whereas lines 45 and 47 are executed five times. In the example, the condition is therefore both fulfilled, in particular three times, and non-fulfilled, in particular twice.

Table 2 indicates an example of a mutation Mj inserted in line 45 of the program P illustrated in table 1 so as to generate the mutated program Pj.

TABLE 2

| Line Number | Code |
| --- | --- |
| 45 | if (TRUE) then |
| 46 | a<=a+1 ; |
| 47 | end if ; |

The mutation consists in replacing the condition (a=b) by the value "TRUE" and thus systematically causes execution of the instruction of line 46 after each execution of line 45. The mutation Mj is then liable to modify the result RTkj of the test Tk and the test Tk is therefore relevant for the mutation Mj. The test Tk is then selected for the suite Uj of relevant tests for the given mutation Mj, in the step F4.

Table 3 illustrates another example of code coverage CC' of the three lines 45 to 47 of the above program performed with another test Tk'.

TABLE 3

| Line Number | Code Coverage CC' | Code |
| --- | --- | --- |
| 45 | 4 | if(a=b) then |
| 46 | 4 | a<=a+1 ; |
| 47 | 4 | end if ; |

The code coverage CC' indicates that the instruction of line 46 is executed four times with the test Tk' and that the lines 45 and 47 are also executed four times with the test Tk'. In the example, the condition of line 45 is then always fulfilled.

The mutation Mj illustrated in table 2 is then not liable to modify the result RTk'j of the test Tk' and the test Tk' is therefore not relevant for the mutation Mj. The test Tk' is then not included in the suite Uj of relevant tests for the given mutation Mj. In the case where all the tests are non-relevant, the mutation is not used in the subsequent part of the method.

According to the invention, the method comprises determination of at least one ranking system by application of at least one simplicity criterion to the selected tests. In the particular embodiment represented in FIG. 5, after selection F4 of the relevant tests, determination of at least one ranking system comprises determination F6 of a ranking system Cm of the mutations Mj by application of a first simplicity criterion to the suites Uj of previously selected tests. For example, the ranking system Cm of the mutations Mj is established, after determination of the number Nj of tests Tk of each test suite Uj, in increasing order of the number Nj of tests Tk of each test suite Uj. The ranking system Cm of the mutations Mj can also be established in increasing order of the computing resources required by each test suite Uj or in increasing order of the estimated time required for execution of each test suite Uj. For example, the time required for execution of the non-mutated program P with all the tests Tk (step F2) of the associated test suite Uj is determined, and the ranking system Cm of the mutations Mj is established in increasing order of the time required for execution of the non-mutated program P executed with all the tests Tk of the test suite Uj.

The ranking system Cm of the mutations can be established according to several first criteria that are applied simultaneously, possibly according to a hierarchy of first criteria. For example, the mutations Mj are first ranked according to the number Nj of tests Tk of each test suite Uj and then, when several numbers Nj of tests Tk are equal, an additional first criterion is applied. Thus, the ranking system Cm of the mutations Mj can comprise a suite of mutation ranking subsets.

The mutations can, in known manner, be grouped according to different types. Types of mutations are for example mutations by omission of a numerical value or mutations by insertion of an incorrect logic factor. The ranking system Cm of the mutations Mj can thus be modified or adjusted according to the types of mutations. Within a mutation ranking subset for example, the mutations can be ranked according to the types of mutations.

The ranking system Cm of the mutations can also be adjusted according to parts Lj of the non-mutated program P designed to be modified by the mutations Mj, for example by grouping all the mutations Mj designed to be inserted in one predetermined line Lj at the beginning of the ranking system Cm, and by grouping all the mutations Mj' designed to be inserted in another predetermined line Lj' further on in the ranking system Cm. In this way, the ranking system Cm of the mutations Mj can comprise a suite of mutation ranking subsets each corresponding to a predetermined part of the non-mutated program P.

The different mutation ranking subsets are obtained by applying the first simplicity criterion as described above. The ranking system Cm of the mutations Mj can also be modified or adjusted according to the probability of the mutations of being detected. Thus, when certain types of mutations prove more difficult to detect, i.e. are detected less often, they can be placed nearer the beginning of the mutation ranking system Cm.

In general manner, a simplicity criterion corresponds a priori to a mutation detection probability criterion and thus automatically creates a ranking system of the mutations in the order of increasing probability of the mutations of being detected.

The ranking system of the mutations can also be determined taking account of the subtlety of the mutations. A means for measuring the subtlety of a mutation inserted in a single line is the number of times said line is activated by the tests. The more often said line is activated, the less the corresponding mutation is considered to be subtle. The subtle mutations are preferably placed at the beginning of the ranking system of the mutations.

The mutated programs Pj arising from step F1 are then executed respectively in steps F7, in the order of the ranking system Cm of the mutations Mj. Each mutated program Pj is executed with the tests Tk of the associated test suite Uj selected in step F4.

The mutations Mj associated with the test suites Uj presenting the greatest simplicity are tested first. In this way, when the total duration of the evaluation method is limited, a maximum number of different mutations Mj is tested before final interruption of the method. The method enables a higher percentage of non-detected mutations to be obtained than a method selecting the mutations in random manner for example. The method thus enables the inefficient tests Tk to be determined more efficiently so as to eliminate them if need be. In the particular embodiment represented in FIG. 5, when the time t is equal to or greater than a predetermined stopping time ts, as represented at the YES output of step F8, execution of the mutated programs F7 is interrupted in a step F9. When the time t is smaller than the stopping time ts, as represented at the NO output of step F8, the time t is incremented in a step F10 and compared with the stopping time ts again in step F8.

The result RTkj provided after each step F7 of execution of a mutated program Pj with a predetermined test Tk is stored in a step F11. In a step F12, comparison is made of the results RTkD and RTkj, respectively associated with execution of the non-mutated program P with the predetermined test Tk, and with the mutated program Pj with the predetermined test Tk. When the results RTkD and RTkj are identical (YES output of F12), the mutation index j and test index k are stored in a step F13. The mutated program Pj providing, with a predetermined test Tk, a result RTkj identical to a result RTkD provided by said non-mutated program P executed with said test Tk, is thus identified. Such an identification is equivalent to non-detection of the corresponding mutation Mj. A mutation Mj is considered to be detected when the corresponding mutated program Pj provides, with a predetermined test Tk, a result RTkj different from the result RTkD provided by said non-mutated program P executed with said test Tk.

After step F12, the mutated program Pj is executed with the next test Tk, in step F7, until the mutated program Pj is executed with all the tests of the associated test suite Uj. Then the next mutated program Pj according to the ranking system Cm is executed with the tests of the associated test suite Uj.

In a particular embodiment, the method comprises programming of the programmable circuit 1 by the program P and by the mutations Mj so as to create logic sets Gj associated with the mutations Mj. The programmable circuit 1 is then activated according to the method according to the invention, which enables a test evaluation result to be obtained in a shorter time than the time necessary for an activation method of a programmable circuit 1 according to the prior art, while at the same time maximizing the number of activated and tested logic sets Gj.

Figure 6:
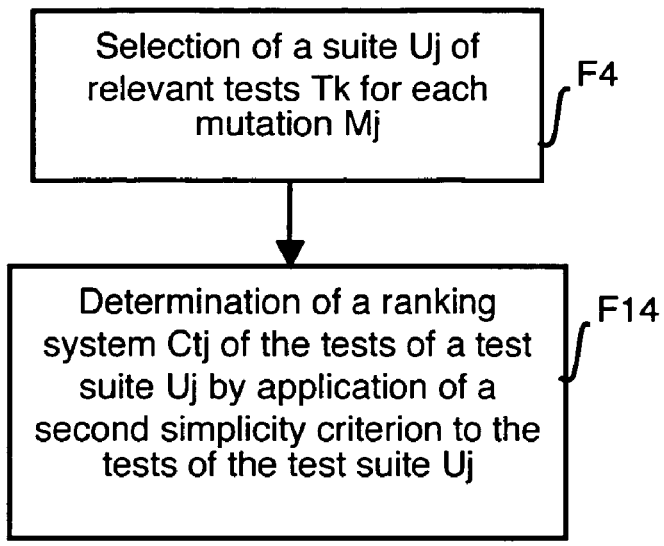
FIG. 6 illustrates a particular embodiment of a step of determination of a test ranking system of a method according to the invention.

In the particular embodiment represented in FIG. 6, determination of at least one ranking system comprises, after selection F4 of a suite Uj of relevant tests for each mutation Mj, determination F14 of a ranking system Ctj of the tests of a test suite Uj by application of a second simplicity criterion to the tests Tk of said test suite Uj. Each mutated program Pj is then executed in the order of the ranking system Ctj of the tests of the associated suite Uj. For example, the execution time of the non-mutated program P with each test Tk (step F2) in the test suite Uj is determined and the ranking system of the tests Tk of a test suite Uj is established in increasing order of the execution time of the non-mutated program P with each test Tk of the test suite Uj. The ranking system Ctj of the tests of a test suite Uj can also be established in increasing order of the computing resources required by each test Tk of the test suite Uj. The ranking system Ctj of the tests presents the advantage of maximizing the number of detected mutations when the total test time of the mutation Mj is limited.

The method can thus comprise determination of a ranking system Cm of the mutations and/or determination of a ranking system Ctj of the tests of a test suite Uj. Each ranking system can be established taking account of a single corresponding criterion or of several corresponding criterion at the same time.

In a particular embodiment of the invention, the ranking system Ctj of the tests Tk of a test suite Uj is reduced to a first test of the ranking system Ctj of the tests Tk, for example by eliminating all the tests that follow the first test of the test ranking system. This makes it possible to identify, in a test step of short duration, mutations which are for example detected by a simplified test, in particular by a test only comprising the first test of the associated test suite Uj. The non-detected mutations (called subtle mutations) can then be analyzed by executing all of the tests of the associated test suites Uj, for the non-detected mutations.

Figure 7:
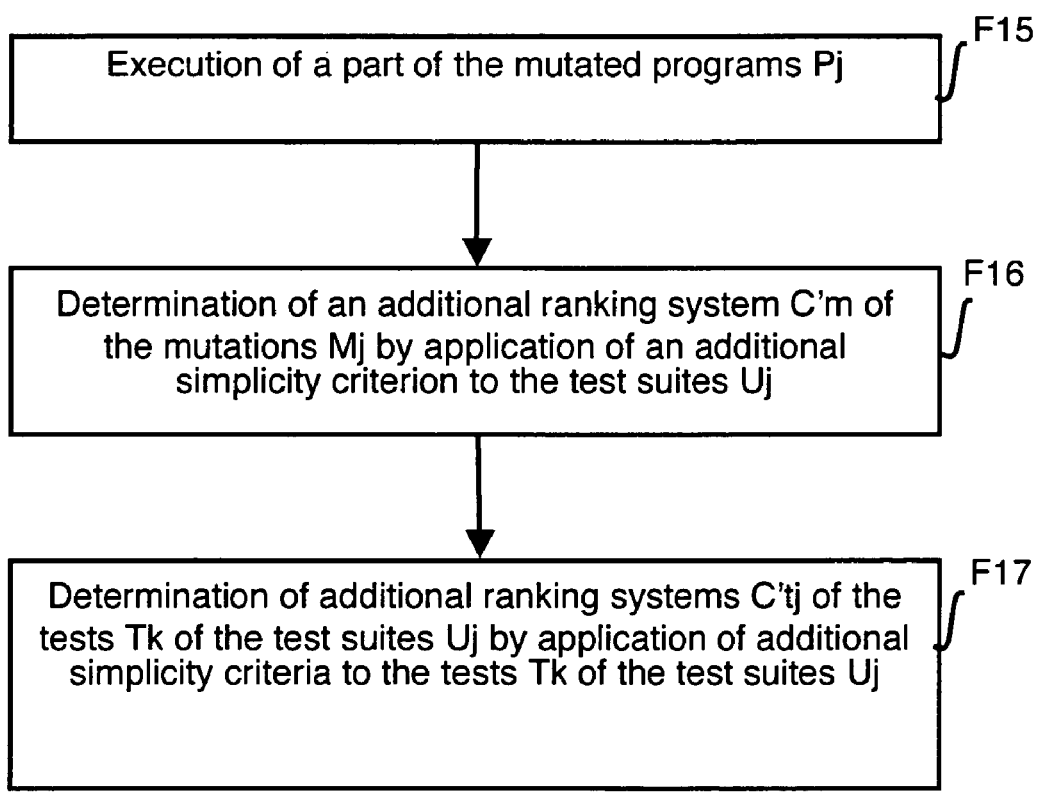
FIG. 7 illustrates a particular embodiment of two steps of determination of additional ranking systems.

After the mutated programs Pj have been executed, i.e. during the analysis, it may be advantageous to modify the ranking systems Ctj of the tests and/or the ranking system Cm of the mutations Mj choosing other simplicity criteria than before. This can in particular be performed according to the results of the mutated programs Pj that have already been executed. Thus, as represented in FIG. 7, the method comprises, after execution F15 of a part of the mutated programs Pj, determination F17 of additional ranking systems C'tj of the tests Tk of the test suites Uj by application of additional simplicity criteria to the tests Tk of the test suites Uj. As represented in FIG. 7, the method can also comprise determination F16 of an additional ranking system C'm of the mutations Mj by application of an additional simplicity criterion to the selected test suites Uj. After the steps F16 and/or F17, execution F7 of the non-executed mutated programs Pj can be continued in the order of the additional ranking system C'm of the mutations Mj and/or respectively in the order of the additional ranking systems C'tj of the tests Tk. Execution of the mutated programs Pj can for example be interrupted several times if necessary to create new additional ranking systems C'm and/or C'tj. It is also possible to create new additional ranking systems (C'm and/or C'tj) at the same time as analysis of mutations in progress, i.e. at the same time as execution of a part of mutated programs Pj. Then a next part of mutated programs Pj is executed in the order of the new additional ranking systems C'm and/or C'tj.

The tests Tk can be grouped according to several second criteria, within a ranking system C'tj of tests Tk. For example, when, in the course of analysis, two tests Tk and Tk* have detected a mutation Mj inserted in a predetermined part Lj of the program P, these two tests Tk and Tk* can be preferred for testing the mutations Mj which have not yet been tested and which are designed to be inserted in said part Lj of the non-mutated program P. These two tests Tk and Tk* are then preferably placed at the beginning of an additional ranking system C'tj of the tests Tk for a next mutation Mj designed to be inserted in said part Lj.

A corresponding simplicity criterion can therefore take account of the number of mutations Mj detected by the tests Tk, in a predetermined part Lj of the program P. Then the test Tk having detected the highest number of mutations in this predetermined part Lj is placed at the beginning of the additional ranking system C'tj of tests Tk for testing of the mutation Mj designed to be inserted in said part Lj. Mutation analysis is thus improved according to the results obtained previously during mutation analysis.

Figure 8:
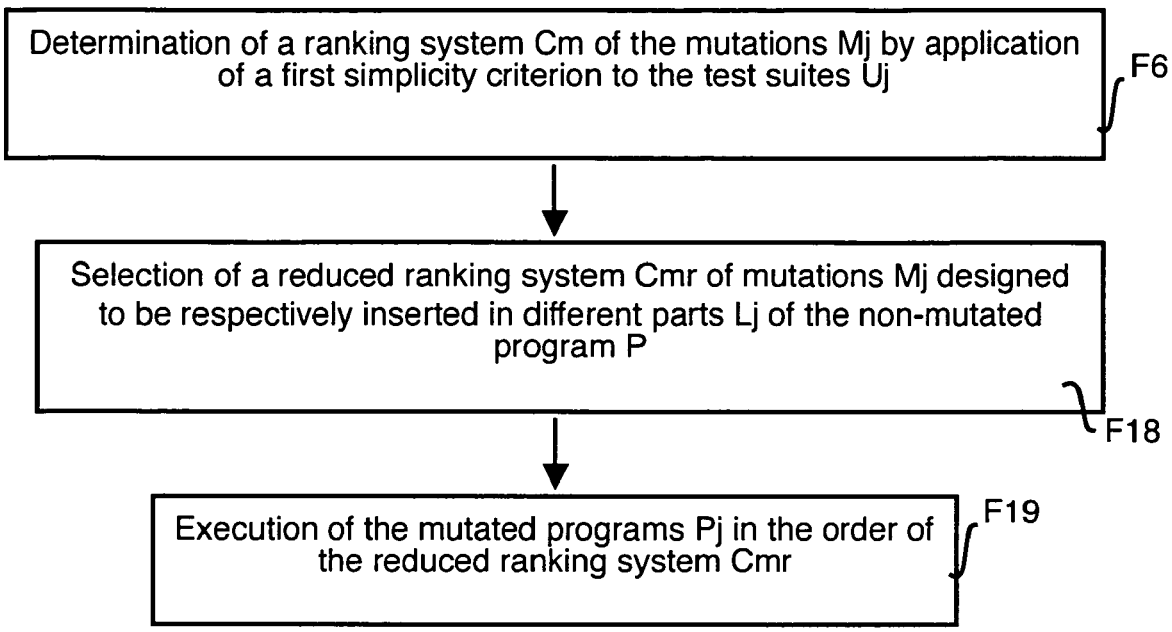
FIG. 8 illustrates a particular embodiment of a step of selection of a reduced ranking system of mutations of a method according to the invention.

In another particular embodiment, represented in FIG. 8, the method comprises selection of a reduced ranking system Cmr of mutations Mj in a step F18, after determination of the ranking system Cm of the mutations Mj (step F6). The reduced ranking system Cmr of mutations comprises mutations designed to be inserted respectively in different parts Lj of the non-mutated program P. When several mutations of the ranking system Cm are for example designed to be inserted in the same line of the non-mutated program P, the first-ranking mutation of these mutations according to the ranking system Cm is retained for the reduced ranking system Cmr and is followed, in the reduced ranking system Cmr, by a mutation designed to be inserted in a different line. Execution F19 of the mutated programs Pj, corresponding to step F7, is performed in the order of the reduced ranking system Cmr. Preference is thus given to testing of different parts Lj over multiple testing of a single part Lj.

Figure 9:
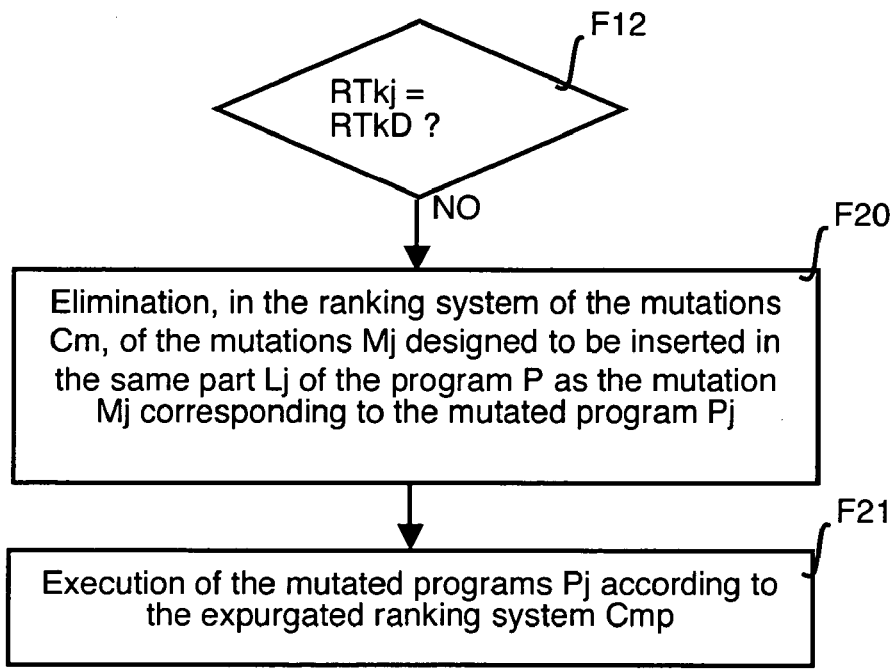
FIG. 9 illustrates a particular embodiment of a step of elimination of mutations of a method according to the invention.

In a particular embodiment, represented in FIG. 9, when a predetermined mutated program Pj provides, with a predetermined test Tk, a result RTkj that is identical to the result RTkD provided by said non-mutated program P executed with said test Tk (step F12), the method comprises elimination, in a step F20, in the ranking system Cm of the mutations, of all the mutations Mj designed to be inserted in the same part Lj of the non-mutated program P as the mutation Mj corresponding to said predetermined mutated program Pj so as to obtain an expurgated ranking system Cmp. The mutated programs Pj are then executed according to the expurgated ranking system Cmp, in a step F21 corresponding to step F7. When a mutation inserted in a predetermined line, for example, has been detected by a test Tk, all the mutations concerning the same line are then eliminated from the ranking system Cm. The part Lj of the non-mutated program P can for example be formed by a line, by a block or by a module of the non-mutated program P or by a set of lines, by a set of blocks or by a set of modules.

The computer program P can be an integrated circuit model expressed in any description language such as Verilog or VHDL for example.

A system for evaluating tests of a computer program P by analysis of mutations Mj according to the invention comprises a checking system 2 to check the different steps of the evaluation method according to the invention, for example for activation of a programmable circuit 1.

A computer-readable medium, for example a CD-ROM, a hard disk, a floppy disk, etc . . . contains computer command instructions to execute a method for evaluating tests of a computer program P by analysis of mutations Mj according to the invention, the method comprising execution of mutated programs Pj by insertion of mutations Mj and identification of the mutated programs Pj providing, with a predetermined test Tk, an identical result RTkj to a result RTkD provided by said non-mutated program P executed with said test Tk.

The invention claimed is:

1. A method for evaluating tests of a computer program by mutation analysis, the method, executed on a computing system, comprising:
   determining a set of mutations to be inserted into the by a computer;
   selecting, from a plurality of tests, a group of relevant tests for each mutation of the set of mutations;
   determining a ranking system in which the mutations are ranked in an order according to at least a first simplicity criterion applied to the selected groups of relevant tests;
   in the ranking order of the mutations, executing, for each mutation, a corresponding mutated computer program with the corresponding group of relevant tests, the corresponding mutated computer program corresponding to the computer program in which the mutation has been inserted;
   comparing, for each mutation and for each corresponding relevant test, a result of the execution of the mutated computer program to a result of the execution of the computer program that has not been mutated; and
   identifying the mutated computer program if the mutated computer program provides, when executed with a corresponding relevant test, a result identical to a result produced by the computer program that has not been mutated, when executed with the same test.

2. The method according to claim 1, comprising
   programming a programmable circuit by the computer program that has not been mutated and by the mutated computer programs; and
   activating the programmable circuit,
   the programmable circuit comprising:
      logic sets respectively associated with the mutations,
      test inputs to which a checking system applies signals representative of test data,
      test outputs transmitting signals representative of test results to the checking system, and
      at least one activation input to which the checking system selectively applies activation or deactivation signals of the logic sets,
   the programmable circuit being programmed in such a way that operation thereof corresponds to the computer program that has not been mutated when the logic sets are deactivated and to one of the mutated computer programs when the corresponding logic set is activated,
   the method comprising testing of the programmable circuit configured to correspond to the computer program that has not been mutated and of the programmable circuit separately configured to correspond to each of the mutated computer programs, a mutated computer program being identified when the programmable circuit, configured to correspond to the mutated computer program, provides, with a predetermined test, a result identical to the result provided, with the same test, by the programmable circuit configured to correspond to the computer program that has not been mutated.

3. The method according to claim 1, wherein the ranking system of the mutations is established in increasing order of the number of tests of each group of tests.

4. The method according to claim 1, wherein the ranking system of the mutations is established in increasing order of the execution time of the computer program that has not been mutated, executed, for each of the mutations, with all the tests in the corresponding group of relevant tests.

5. The method according to claim 1, wherein the ranking system of the mutations is adjusted according to types of mutations.

6. The method according to claim 1, wherein the ranking system of the mutations is adjusted according to parts of the computer program that has not been mutated designed to be modified by the mutations.

7. The method according to claim 1, wherein the ranking system of the mutations is modified according to the probability of the mutations being detected.

8. The method according to claim 1, further comprising,
   after execution of a part of the mutated computer programs, determining an additional ranking system of the mutations by application of an additional simplicity criterion to the selected groups of relevant tests; and
   executing the non-executed mutated programs in the order of the additional ranking system of the mutations.

9. The method according to claim 1 further comprising,
   after determination of the ranking system of the mutations, selecting a reduced ranking system of the mutations to be respectively inserted in different parts of the computer program that has not been mutated; and
   executing the mutated programs being performed in the order of the reduced ranking system.

10. The method according to claim 1 wherein, when a predetermined mutated computer program provides, with a predetermined test, a result identical to a result provided, with the same test, by the computer program that has not been mutated, the method further comprises
    eliminating in the ranking system of the mutations, all the mutations to be inserted in the same part of the computer program that has not been mutated as the mutation corresponding to the predetermined mutated program.

11. The method according to claim 1, wherein execution of the mutated computer programs is interrupted after a predetermined time.

12. A system for performing the method for evaluating tests of a computer program by mutation analysis according to claim 1, comprising execution of mutated computer programs by insertion of mutations and identification of the mutated computer programs providing, with a predetermined test, a result identical to a predetermined result, said system comprising means for:
    selection, from a plurality of tests, of a group of relevant tests for each mutation;
    determination of at least one ranking system by applying at least one simplicity criterion to the selected tests; and
    execution of the mutated computer programs in order of ranking, each mutated computer program being executed with the tests of the corresponding group of relevant tests.

13. A computer-readable medium comprising computer command instructions to execute a method for evaluating tests of a computer program by mutation analysis according to claim 1, comprising execution of mutated computer programs by insertion of mutations and identification of ones of the mutated computer programs that provide, with a predetermined test, a result identical to a predetermined result, the medium comprising command instructions to execute:
    selection, from a plurality of tests, of a suite of relevant tests for each mutation;
    determination of at least one ranking system by applying at least one simplicity criterion to the selected tests; and
    execution of the mutated computer programs in order of ranking, each mutated computer program being executed with the tests of the associated test suite.

14. A method for evaluating tests of a computer program by mutation analysis, the method, executed on a computing system comprising:
- determining a set of mutations to be inserted into the computer program by a computer;
- selecting, from a plurality of tests, a group of relevant tests for each mutation of the set of mutations;
- determining a ranking system in which the tests of the group of tests are ranked in an order according to a simplicity criterion applied to the tests of the group of tests;
- in the ranking order of the tests of a corresponding group of relevant tests, executing for each mutation, a corresponding mutated computer program with the corresponding group of relevant tests the corresponding mutated computer program corresponding to the computer program in which the mutation has been inserted;
- comparing, for each mutation and for each relevant test, a result of the execution of the corresponding mutated computer program to a result of the execution of the computer program that has not been mutated; and
- identifying a mutated computer program if the mutated computer program provides, when executed with a corresponding test, a result identical to a result produced by the computer program that has not been mutated, when executed with the same test.

15. The method according to claim 14, wherein the ranking system of the tests of a corresponding group of relevant tests is reduced to a first test of the ranking system of the tests.

16. The method according to claim 14, wherein the ranking system of the tests of a group of relevant tests is established in increasing order of the execution time of the computer program that has not been mutated executed with each test of the group of relevant tests.

17. The method according to claim 14, wherein the ranking system of the tests of a group of relevant tests is established in increasing order of computing resources required by each test.

18. The method according to claim 14, further comprising:
- after execution of a part of the mutated computer programs, determining additional ranking systems of the tests of the group of relevant tests by application of additional simplicity criteria to the tests of the group of relevant tests; and
- executing the non-executed mutated computer programs in the order respectively of the additional ranking systems of the corresponding tests.

* * * * *